June 15, 1937.  R. STEINER  2,084,292
COMPACT
Filed Jan. 2, 1937
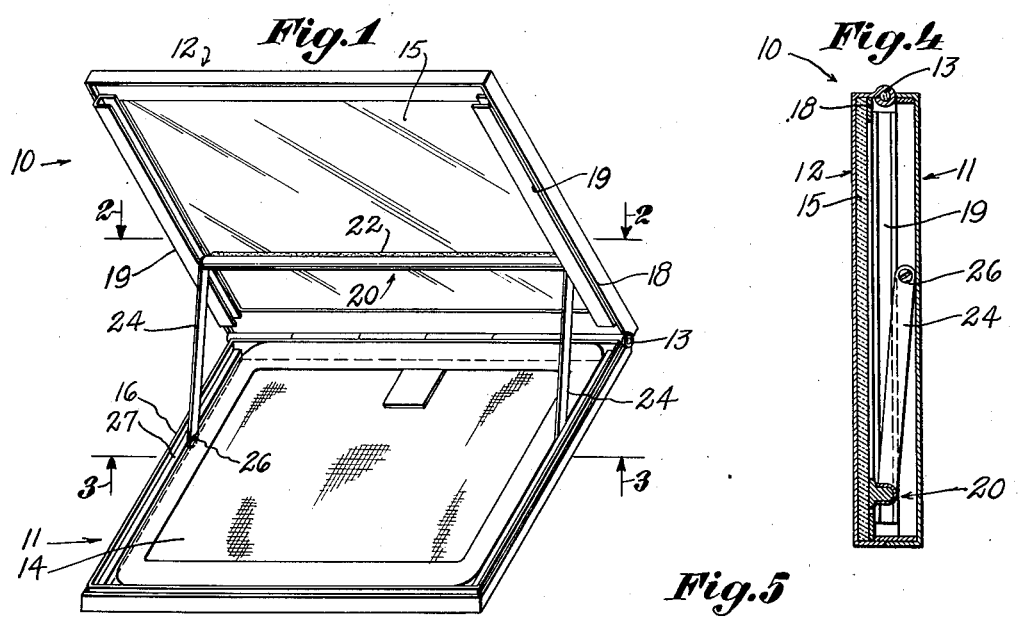
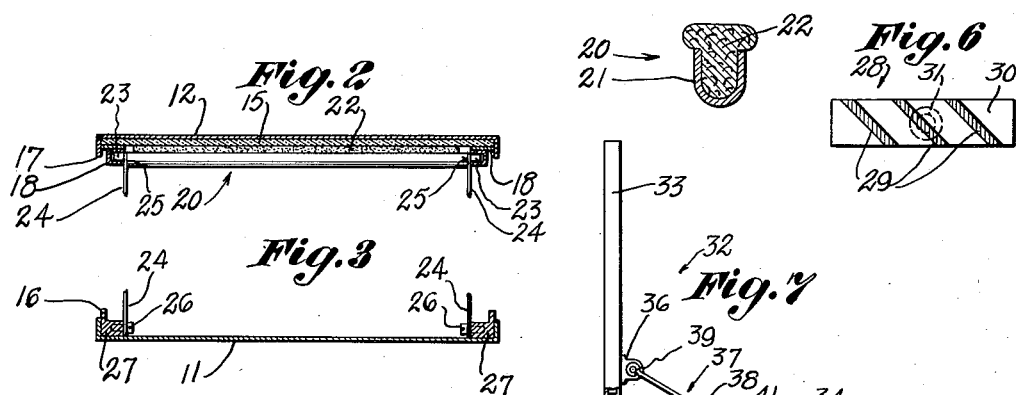
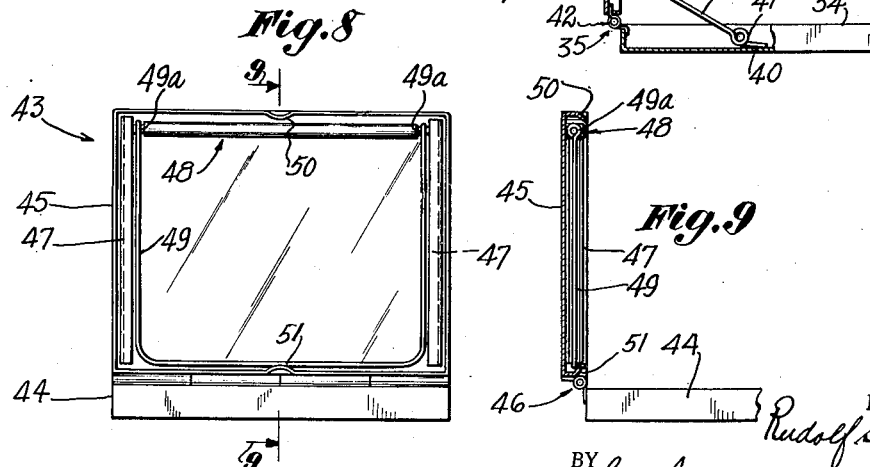
INVENTOR.
Rudolf Steiner
BY
Chris Shumacher ATTORNEY.

Patented June 15, 1937

2,084,292

UNITED STATES PATENT OFFICE 2,084,292

COMPACT

Rudolf Steiner, Vienna, Austria

Application January 2, 1937, Serial No. 118,789

13 Claims. (Cl. 132—83)

This invention relates to containers, powder compact cases and other devices having a plurality of leaf-like elements movable toward and away from each other.

One object of the invention is to provide a device of the character described having a member movable constantly over the face of one of the leaf-like elements in response to relative movement of the latter toward and away from each other.

Another object of the invention is to provide a container or compact case having a mirror surface, and means responsive to opening movement of the container for causing the mirror surface to be exposed in clean condition, and particularly free of any face powder or other pulverulent material which would otherwise mar the clearness of the mirror face.

Broadly, the invention aims to provide a device such as a compact case adapted to tightly retain powder and having an inner mirror surface which is exposed for use when the case is opened, and means housed within the device for cleaning the mirror face by a simple and reliable actuation.

I have observed that in compact cases, powder settles on the mirror surface so that the user frequently wipes the same clean with her finger or with a handkerchief. This has occurred also in compact cases having a plurality of leaves or mirrors, variously arranged, and even the mirror face which was not directly exposed to the powder, became obscured by settlement thereon of powder which would seep through the most minute spaces or crevices.

An object of this invention is therefore to overcome these defects and difficulties and to provide a simple, inexpensive, durable and reliable structure which is small and neat in appearance and rapid and convenient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a perspective isometric view showing a device embodying the invention, in the open position thereof.

Figs. 2 and 3 are sectional views taken on the lines 2—2 and 3—3 of Fig. 1.

Fig. 4 is a sectional view of the device in closed position.

Fig. 5 is a cross sectional view of a wiper element.

Fig. 6 is a cross sectional view of a modified or multivane wiper element.

Fig. 7 is a diagrammatic sectional view of a modified device embodying the invention, in open position.

Fig. 8 is a front view in open position of another modification of the invention.

Fig. 9 is a sectional view taken on the line 9—9 of Fig. 8.

The advantages of the invention as here outlined are best realized when all of its features and instrumentalities are combined in one and the same structure, but, useful devices may be produced embodying less than the whole.

Generally described, the invention provides a container such as a compact case having a mirror means associated therewith for movement along a predetermined path to clean the mirror or to present the mirror in clean condition for use. Thus a wiper means may be movable over the mirror, or means may be provided with which the mirror has relative movement to prevent powder from settling on the mirror or to encase the same and to expose the mirror in clean condition for use when desired. Either means may be operated manually or semi-automatically as in response to an opening movement of the case or a movement of the mirror into operative position. The wiper represents the preferred embodiment since it can clean the mirror in a positive manner of even the finest grains of powder. Preferably, the structure employed is wholly housed in the compact case so that the device presents a smooth and neat external appearance. The disposition of the structure is such that the interior of the compact case is not obstructed, and the area of the mirror is substantially entirely exposed for observation. Desirably the structure is marginally disposed in the case, and the wiper moves downward to discharge removed powder into the box element of the compact case. If semi-automatic actuator means are employed, the same may include any desired mechanism such as links, levers, gears, pulleys, springs or combinations thereof, as may be well known to the mechanical engineer. If such semi-automatic means are employed, the invention may be construed to cover the mirror wherever located, and regardless whether embodied in combination with a container or merely with relatively movable leaves. In that respect the wiper may be considered broadly a means for affecting or acting upon a plate having indicator means, since a mirror serves as an indicator of the conditions of the object presented thereto.

Referring in detail to the drawing, 10 denotes a device embodying the invention. The same may include a pair of leaves arranged for relative movement to each other. For example, one leaf may be in the nature of a box element 11, 60 and the other leaf may be a cover or companion box element 12, these being preferably hingedly interconnected at 13. The box element 11 may be a container for an article such as a face powder, and may include a conventional powder sifter 14 therein. The cover element may comprise a mirror 15 or may be otherwise provided with a mirror surface on its inner face. The elements 11, 12 may have their marginal edges 16, 17 adapted for stepped interengagement to make the box tight; thus the edges 17 are adapted to engage around the edges 16.

If a glass mirror 15 be used, the same may include rectangular frame element 18 suitably snapped into or secured to the cover element 12 to retain the mirror. A guide means mounted on the cover element may include elongated members 19, preferably mounted on the frame 18 so as to be assembled as a unit in the cover. If desired, the guide members may be in the nature of channels facing each other.

A wiper member 20 may include a back or channel frame 21 in which is secured a wiping fabric of leather or the like 22. Said back 21 may be provided with end pins 23 movable along the channels 19 to thus hold the wiper element in snug contact with the mirror. The size of the wiper portion 22 is such as to prevent rotation of the wiper element in course of its movement.

For actuating the wiper element, a pair of links 24 are pivotally connected at one end to the pins 23 between the channel guides and the shoulder 25 of the wiper element. The other end of the links 24 may be pivotally connected at 26 to the box element intermediate of the leading edge thereof and the hinge connection. If desired, bars 27 may be secured to the box element 12, with which bars the pivotal engagement at 26 is effected.

It will now be perceived that when the device 10 is being opened while held in normal position, that is, with the box element 11 facing upward, the links 24 pull the wiper 20 downward to cause discharge into the box element 11 of powder that may have settled on the mirror. While this is occurring, the wiper is held snugly against the mirror by the channels 19. When the device 10 is fully opened, so that the elements 11, 12 form an oblique angle therebetween, the wiper 20 lies close to the hinge connection 13 so that substantially the entire mirror is free for observation. In that position, the links 24 lie almost flat with the box element 11, so as to be out of the way, and said links may laterally abut the hinge to form a stop. When the device 10 is being closed, the wiper is moved upward, and it finally lies at the leading edge of the cover element 12 when the case is closed, as shown in Fig. 4, and with the links 24 lying along the sides or margins of the case. Thus the interior of the case is not obstructed, and can freely receive a powder puff or other articles as may be required.

By using a plurality of links 24, the wiper 20 is caused to reciprocate parallel to the hinge axis, and without becoming loose at the channels 19 or binding thereat. It will be noted that the links describe almost a straight angle in course of their movement, and may be generally representative of angularly movable means responsive to relative angular movement between the elements 11, 12 to cause a movement, for instance, a lineal movement of the cleaner 20.

For compactness and symmetry, the channels 19 and member 20 may project laterally so as to be partially received in the box element 11, with the channels lying alongside of the strips 27. In any event, the guide means, wiper member and links are entirely housed in the case.

Instead of the wiper portion 22, a device 28 may be employed which may comprise a plurality of parallel vanes or louvres 29 of rubber, metal, or other suitable material, connected at their opposite ends to frame portions 30 which may carry pins 31 corresponding to the pins 23. These vanes may be suitably inclined upward or downward relative to the face of the mirror 15 and afford a successive cleaning action for the latter.

In Fig. 7 is shown a device 32 embodying the invention and which may comprise a pair of leaves 33, 34 hingedly interengaged at 35, so that the element 33 may act as a cover for the box 34. The element 33 may have an indicator or mirror surface which is to be cleaned, and hence may have a wiper 36 associated therewith for relative movement by a means 37. The arrangement is such that the channels 19 may be omitted. Thus the means 37 includes springs 38 disposed like the links 24 and pivotally connected at 39 to the wiper and secured at 40 to the box element 34. Each spring 38 may include a coil 41, so that the movement of the springs may be similar to that of the links. To prevent the springs from throwing the cover open with undue rapidity and to assure that the wiper will maintain its engagement with the cover, a counteracting means such as a coil spring 42 may be provided at the hinge 35 to tend to close the cover in the usual manner.

At 43 is shown a device embodying another modification of the invention, and comprising box and cover elements 44, 45 hingedly interconnected at 46. The cover element may have an inner mirror surface, and channel guides 47 for the wiper 48. The structure may be wholly like that of the device 10, except that the wiper may be manually actuated as by a U-shaped element or bail 49, whose ends are pivotally connected to the wiper at 49a, in the manner of the links 24. The element 49 is of the same size and shape as the mirror so as to frame the same as shown in Fig. 8, whereby the mirror is fully visible. To retain the parts in set position, the cover 45 may have projections 50, 51, the former engaging the wiper, the latter the bail.

In use, the bail is grasped, swung upward, and used to move the wiper downward, and the parts are then engaged with the adjacent projections 50, 51. Upon the next succeeding operation, the bail is pulled out of snap engagement with its projection 50, pulled upward to move the wiper and then swung downward and reengaged with the projection 51.

I claim:

1. A powder box including a plurality of box elements hingedly interconnected for movement toward and away from each other, one of said elements having a mirrored surface, a wiper member for the latter reciprocable across said surface to clean the same, the element having the mirrored surface having channel guide means for slidably receiving the wiper element, and actuator means interconnecting the other element with the wiper member to cause reciprocation of the latter upon relative movement between the elements.

2. A compact case including a plurality of leaves interengaged for relative movement toward and away from each other so that one of the leaves is adapted in one position to cover and in a second position to expose a face of the other leaf, the latter having rigid longitudinal guide channels, said face constituting a mirror, a wiper bar movable to and fro over said face along said channels and having positions of rest at edges of said face so as to permit a relatively unobstructed view of the mirror, and actuator means for the wiper bar responsive to relative movement between the leaves and causing the wiper bar to lie in its positions of rest when the leaves are in their said relative positions to each other.

3. A compact case, including a box element, a box like cover element therefor, said elements being hingedly interconnected at edges thereof, so that the cover element opens into upright position, the box element being adapted to receive powder, the cover element having an inner mirror surface and having longitudinal marginal channels within the cover member, a wiper movable along the mirror surface and guided by the channels so as to lie near the hinge connection when the case is open, and remote from the hinge connection when the case is closed, and means actuated by the box element to cause said movement of the wiper, whereby the wiper moves downward as the case is opened in normal position to discharge downward into the box element powder that settled on the mirror face.

4. A compact case, including a box element, a cover element therefor, said elements being hingedly interconnected at edges thereof so that the cover element opens into upright position, the box element being adapted to receive powder, the cover element having an inner mirror surface and having channel guides along opposed edges, a wiper guided by the channel guides and movable along the mirror surface so as to lie near the hinge connection when the case is open, and remote from the hinge connection when the case is closed, and means swingably engaged with the box element intermediate of the hinge connection and the leading edge thereof to cause the wiper to move downward toward the hinge connection when the case is open and to move toward the leading edge of the cover element when the case is closed, and the actuator means lying along the elements in the closed position of the case.

5. A compact case, including a box element, a cover element therefor, said elements being hingedly interconnected at edges thereof so that the cover element opens into upright position, the box element being adapted to receive powder, the cover element having marginal guide channels and an inner mirror surface, a cleaner member for the latter guided by the channels and movable therealong parallel to the hinge connection, and actuator means operated by relative movement of the box element and including like means disposed at the ends of the latter for actuating said cleaner member at the ends thereof to cause the parallel movement of the cleaner member.

6. A compact case including a box element adapted to receive powder, a cover element therefor of box shape, said elements being hingedly interconnected at edges thereof, the cover element having channel guide members along certain edges thereof, said guide members being spaced inward of said edges to permit the latter to engage companion edges of the box element to cause the case to tightly retain the powder when the case is closed, the cover element having its inner surface intermediate of the guides adapted to constitute a mirror, and a cleaner element for the mirror movable along the guide members.

7. A compact case including a box element adapted to receive powder, a cover element therefor of box shape, said elements being hingedly interconnected at edges thereof, the cover element having elongated rigid guide members along certain edges thereof, said guide members projecting laterally of the cover element, and the box element being adapted to receive the projecting portions of the guide members when the case is closed, the cover element having its inner surface intermediate of the guide members adapted to constitute a mirror, and a cleaner element for the mirror movable along the guide members.

8. A compact case including a powder box element, a cover element hingedly connected thereto and having an internal mirror surface, channel guides extending along the inner face of the cover element in relative proximity to edges thereof, and a cleaner member for the mirror surface engaged in the guides for movement along the mirror surface.

9. A compact case including a box element adapted to receive powder, a cover element therefor of box shape, said elements being hingedly interconnected at edges thereof, the cover element having channel guide members along certain edges thereof, the cover element having its inner surface constituting a mirror face, a cleaner element movable along the latter and having end portions engaged with the guide members, and means engaged with said end portions intermediate of the guide members for causing movement of the cleaner element.

10. A device including a support, a mirror thereon, a frame element secured to the support for holding the mirror thereon, a wiper element movable to and fro along the mirror, and the frame element having longitudinal channel guide means for the wiper element.

11. A device including a plurality of hingedly interconnected plates one of which constitutes a mirror facing the other plate, an elongated wiper element movable along the mirror element, and spring means connected to the other element intermediate of the leading edge thereof and the hinge connection, said spring means being pivotally engaged with the wiper element to press the latter toward the mirror element and to cause the said movement of the wiper element.

12. A compact including a powder box element, a cover element therefor, the latter having an inner mirror surface, a wiper element for the latter, and laterally projecting channel guide means for the wiper element, whereby the wiper element is adapted to be positioned at an edge of the cover element in the closed position of the case to prevent the wiper element from obstructing the contents of the box element.

13. A compact case including a box element and a cover element hingedly connected thereto and having an inner mirror face, a wiper element for the latter parallel to the hinge connection, link elements pivotally connected to the wiper element at the ends of the latter and swingably connected to the box element intermediate of the leading edge thereof and the hinge connection, and means coacting with the link elements to cause the wiper element to bear against the mirror face with the link elements causing the wiper element to move back and forth upon opening and closing the case.

RUDOLF STEINER.